US012262698B2

(12) United States Patent
Ovesen

(10) Patent No.: US 12,262,698 B2
(45) Date of Patent: Apr. 1, 2025

(54) UNLOADING SYSTEM AND METHOD FOR UNLOADING TRANSPORT UNITS FOR LIVE POULTRY

(71) Applicant: BAADAR FOOD SYSTEMS DENMARK A/S, Trige (DK)

(72) Inventor: Henrik Ovesen, Ebeltoft (DK)

(73) Assignee: BAADER FOOD SYSTEMS DENMARK A/S, Trige (DK)

( * ) Notice: Subject to any disclaimer, the term of this patent is extended or adjusted under 35 U.S.C. 154(b) by 815 days.

(21) Appl. No.: 16/316,750

(22) PCT Filed: Aug. 29, 2017

(86) PCT No.: PCT/EP2017/071595
§ 371 (c)(1),
(2) Date: Jan. 10, 2019

(87) PCT Pub. No.: WO2018/046341
PCT Pub. Date: Mar. 15, 2018

(65) Prior Publication Data
US 2019/0223414 A1 Jul. 25, 2019

(30) Foreign Application Priority Data
Sep. 12, 2016 (EP) .................................. 16188386

(51) Int. Cl.
*A01K 31/07* (2006.01)
*A01K 45/00* (2006.01)
(52) U.S. Cl.
CPC ............ *A01K 45/005* (2013.01); *A01K 31/07* (2013.01)
(58) Field of Classification Search
USPC ........ 119/482, 496, 453, 401, 455, 843–849, 119/330–331, 751, 437, 439, 722, 489,
(Continued)

(56) References Cited

U.S. PATENT DOCUMENTS

| 4,365,591 A | * | 12/1982 | Wills | ..................... | B65D 85/50 |
| | | | | | 119/845 |
| 4,998,967 A | * | 3/1991 | Box | ....................... | A01K 31/07 |
| | | | | | 119/489 |

(Continued)

FOREIGN PATENT DOCUMENTS

| CN | 1126941 | 7/1996 |
| CN | 104853602 | 8/2015 |

(Continued)

OTHER PUBLICATIONS

Europe Search Report/Office Action conducted in counterpart Europe Appln. No. 16 188 386.3 (Feb. 3, 2017) (w/ machine translation).

(Continued)

*Primary Examiner* — Andrea M Valenti
(74) *Attorney, Agent, or Firm* — GREENBLUM & BERNSTEIN, P.L.C.

(57) ABSTRACT

An unloading system for unloading at least one transport unit having at least one rack and at least one transport crate mounted for receiving poultry. The rack includes a transport restraint for each transport crate, which include a bottom and side walls. A cover arranged at a distance from the upper edge of the side walls. The system includes an unloading station for at least one transport unit, a pushing device for ejecting transport crates in an ejection position, and a receiving device for receiving and conveying ejected transport crates. In the ejection position, position of transport crate to the cover is vertically controllable during the entire ejection operation so a maximum distance between the upper edge of trailing side walls of the transport crates in the pushing direction and the cover are maintainable depending on the position of the transport crate within the rack during the ejection operation.

22 Claims, 12 Drawing Sheets

(58) Field of Classification Search
USPC ...... 119/490, 488; 452/53, 183; 414/331.16, 414/331.14, 331.17, 331.18, 797.4, 797.9
See application file for complete search history.

(56) References Cited

U.S. PATENT DOCUMENTS

| | | | |
|---|---|---|---|
| 5,505,582 A | 4/1996 | Wallace | |
| 6,338,316 B1* | 1/2002 | Weaver | A01K 31/002 |
| | | | 119/493 |
| 9,445,578 B2 | 9/2016 | Zanotti | |
| 9,485,967 B2 | 11/2016 | Jansen | |
| 9,497,936 B2* | 11/2016 | Foreman | A01K 31/007 |
| 2008/0118337 A1* | 5/2008 | Vestergaard | B65G 41/008 |
| | | | 414/340 |
| 2014/0283755 A1 | 9/2014 | Zanotti | |
| 2015/0125243 A1* | 5/2015 | Zanotti | A22B 1/00 |
| | | | 414/353 |
| 2015/0208618 A1 | 7/2015 | Jansen | |
| 2016/0198686 A1 | 7/2016 | Jansen | |

FOREIGN PATENT DOCUMENTS

| | | | |
|---|---|---|---|
| CN | 204837519 | 12/2015 | |
| CN | 105578874 | 5/2016 | |
| DE | 38 37 152 | 3/1990 | |
| EP | 2460804 | 1/1981 | |
| EP | 0 956 766 | 11/1999 | |
| EP | 0956766 A1 * | 11/1999 | ............. A01K 45/00 |
| EP | 2 781 270 | 9/2014 | |
| FR | 2460804 | 1/1981 | |
| FR | 2750567 * | 1/1998 | ............. A01K 31/07 |
| WO | 94/27425 | 12/1994 | |
| WO | 2014/031001 | 2/2014 | |

OTHER PUBLICATIONS

"Improving Animal Welfare: A Practical Approach," Ed. Temple Grandin, China Agricultural Univ. Press, $1^{st}$ Ed., pp. 133-134 (Mar. 2014).

China Search Report/Office Action conducted in counterpart China Appln. No. 201780054478.4 (Jan. 25, 2021) (w/ translation).

* cited by examiner

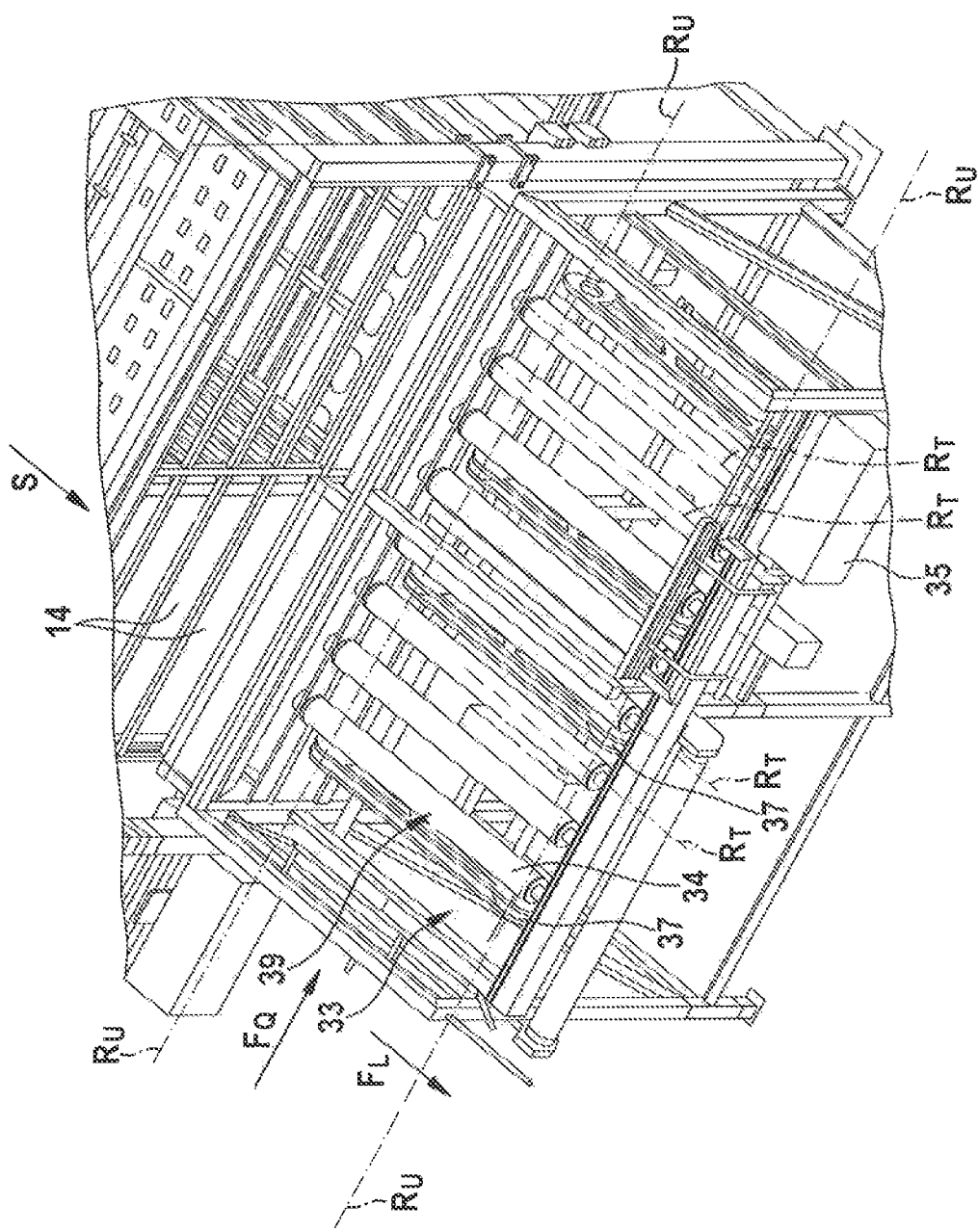

UNLOADING SYSTEM AND METHOD FOR UNLOADING TRANSPORT UNITS FOR LIVE POULTRY

The invention relates to an unloading system, designed and configured for unloading at least one transport unit which is configured for transporting and/or storing live poultry and has at least one rack and at least one transport crate mounted therein for receiving the poultry, wherein the rack comprises a transport restraint for each transport crate and each open-top transport crate has a crate bottom and peripheral side walls, and each transport crate mounted in the rack is covered at the top by a cover which is arranged at a distance from the upper edge of the side walls, which system comprises an unloading station for at least one transport unit, at least one transport unit, a pushing device for ejecting each transport crate situated in an ejection position from the rack in the pushing direction S, and a receiving device for receiving and conveying each transport crate ejected from the rack.

The invention relates further to a method of unloading at least one transport unit which is configured for transporting and/or storing live poultry and has at least one rack and at least one transport crate mounted therein for receiving the poultry, wherein each open-top transport crate has a crate bottom and peripheral side walls, and each transport crate mounted in the rack is covered at the top by a cover which is arranged at a distance from the upper edge of the side walls, which method comprises the steps: introducing at least one transport unit into an unloading station, ejecting at least one transport crate situated in the ejection position from the rack in the pushing direction S by means of a pushing device, and receiving and conveying by means of a receiving device each transport crate ejected from the rack.

Such unloading systems and methods are used in the poultry processing industry. Live poultry is held in transport crates in particular for the purpose of transport and intermediate storage. Individual transport crates or a plurality of transport crates arranged one above another in a stack are mounted in a rack. These units consisting of the rack and at least one transport crate form a transport unit. The transport units with the live poultry are, for example, transported on a lorry from a poultry farm to a factory for poultry processing or stored in the region of the factory for poultry processing. For the actual process of processing the live poultry, the individual transport crates then have to be removed from the rack, for which purpose the unloading systems are used.

The transport crates are pushed by means of the pushing device out of the rack towards the receiving device which receives the transport crates. The transport crates are then conveyed to further processing by means of the receiving device.

The transport crates have a crate bottom and peripheral side walls, so that a receiving space which is open to the top is formed. Inside the rack, the open-top transport crates are covered by a cover so that the live poultry remains in the respective transport crate. This cover may be a simple lid element which is associated with the rack. Conventionally, however, a plurality of such transport crates are situated one above the other in a rack, so that the cover of each transport crate is formed by the crate bottom of a transport crate located above it. The lid element serves as the cover only for the transport crate mounted in the topmost position in the rack.

The cover is at a (base) distance $A_B$ from the upper edges of the side walls of the transport crate arranged beneath it. For reasons of efficiency (for example to save space, to avoid empty volume) and to prevent the live poultry from escaping from the transport crates, this distance is to be kept as small as possible. In practice, this distance is approximately 30 mm, so that a gap is formed between the upper edge of the side walls and the cover located above them. The gap is necessary so that the transport crates can be ejected from the rack as easily as possible by means of the pushing device. The live poultry has a tendency to stand upright and/or move inside the transport crate in particular during the ejection process. This frequently has the result that the live poultry becomes caught by the extremities, such as, for example, the wings or the head, in the gap between the upper edge of the side walls and the cover. This places a high stress on the live poultry, which can lead to the live poultry being injured/damaged. This effect is exacerbated when the distance between the upper edge of the side walls of the transport crates and the cover is changed and in particular reduced by a reduction in the distance between the transport crate and the cover caused by the ejection process, so that the extremities are trapped between the transport crate and the cover. When the transport crates are finally ejected from the rack, shear forces then act upon the extremities, so that they are damaged or, in the worst case, torn off completely.

During the ejection process, the transport crates are raised at their leading end by being pushed over the transport restraints arranged at least in the exit region of the rack, with the result that the transport crate is guided on a slant within the rack during the ejection operation. The slanted position of the transport crates within the rack does not affect the live poultry as long as the live poultry has sufficient room to move and the trailing end of the transport crate with the upper edge of the side walls maintains the maximum (base) distance $A_B$ from the cover located above it. At the latest when the distance of the upper edge of the side walls of the transport crates from the cover is reduced, in particular at the trailing end of the transport crates, for example as a result of the leading end of the transport crate, which is already protruding from the rack, tipping downwards, the extremities become trapped as a result of the reduction in the distance. When the trailing end of the transport crates then reaches the outlet region of the rack, there is no more room to move, on account of the construction of the rack, so that the live poultry is no longer able to move but its extremities are trapped between the upper edge of the trailing side wall and the cover and are cut off.

In the known unloading systems, the individual components, in particular the transition from the transport station to the receiving device, are rigidly connected together or arranged inflexibly relative to one another, so that the position of the transport crates within the rack is determined solely by the ejection process. Possible movements of the transport crates, which affect the distance between the upper edge of the side walls and the cover, cannot be compensated for, so that uncontrolled ejection takes place, with the result that the well-being of the live poultry cannot be ensured.

Accordingly, the object underlying the invention is to provide an unloading system for transport units which is simple and especially protects the live poultry. The object consists further in proposing a corresponding method.

The object is achieved by an unloading system having the features mentioned hereinbefore in that the position of each transport crate situated in the ejection position in relation to the cover can be controlled in the vertical direction during the entire ejection operation, in such a manner that the maximum distance $A_B$ between the upper edge of the trailing side walls of each transport crate in the pushing direction S and the cover can be maintained in dependence on the respective position of the transport crate within the rack during the ejection operation. The maximum distance is the (base) distance $A_B$ given by the construction of the transport crate and the rack. In the original transport or storage position of the transport crates in the rack, that is to say before the start of the ejection operation, the distance between the upper edge of the side walls of the transport crates and the cover is distance $A_B$. Because each transport crate in the ejection position can be controlled during the entire ejection operation, that is to say can be moved in the vertical direction in relation to and relative to the cover, the distance $A_B$ for the upper edge of the trailing side walls can also be kept constant for as long as possible during the ejection operation. Possible distance changes, in particular reductions in the distance of the trailing end of the transport crate relative to the cover, can thereby be compensated for during the ejection operation. The live poultry in the region of the trailing end of the transport crate thus has maximum "headroom" (distance upwards to the cover) available during the entire ejection process. In other words, the maximum gap between the upper edge of the trailing side walls and the cover is maintained in every position, so that the risk of the extremities of the live poultry being trapped and cut off is thus reduced. The risk of injury to the live poultry is reduced with the configuration according to the invention, and the well-being of the live poultry during the process of ejecting the transport crates from the rack is thus optimised.

A particularly preferred embodiment is characterised in that each transport unit is in quadrangular form, wherein each rack is formed and configured for receiving at least two transport crates arranged one on top of the other, so that the crate bottom of one transport crate forms the cover for the transport crate mounted beneath it and the transport crate mounted in the topmost position in the rack is covered by a lid element associated with the rack as the cover, and has a first rack side facing the pushing device and a second rack side, located opposite the first rack side, facing the receiving device and comprises on both rack sides cross-members oriented transversely to the pushing direction S of the transport crates as a transport restraint for each transport crate, which cross-members cooperate with corresponding mouldings in the crate bottom of each transport crate, and comprises for each transport crate, parallel to the pushing direction S of the transport crates, guide rails arranged laterally on the rack for guiding the transport crates within the rack, wherein the vertical distance A between the cross-members arranged one above the other, on the one hand, and between the topmost cross-members and the lid element of the rack, on the other hand, is in each case greater than the total height of a transport crate, at least on the second rack side facing the receiving device. By means of this construction it is ensured on the one hand that the or each transport crate is securely mounted within the rack. On the other hand, this construction also permits simple and quick unloading. In the original transport or storage position, each transport crate is located with the bottom wall on the guide rails on both sides. On both rack sides, each transport crate is located with the bottom wall on the cross-members in such a manner that the lower side of the bottom wall lies beneath the upper edge of the cross-members. In other words, the transport crate is located on both rack sides with the mouldings on the cross-members, so that the cross-members form a barrier. By means of this configuration, and in particular the "cooperation" of the bottom wall and the cross-members, a purely horizontal movement of the transport crate in the pushing direction S and contrary to the pushing direction is prevented. This configuration has the result that each transport crate, upon ejection, is raised at its leading end against the resistance of the cross-member, or is raised out of the secured original transport or storage position, so that the transport crate slides with its bottom wall along the cross-member that is associated with the second rack side facing the receiving device. As a result, the transport crate is initially in a sloping position, in which the leading end is higher than the trailing end. As soon as approximately half the transport crate has been ejected from the rack—at the so-called tipping point—the leading end would fall downwards under the effect of gravity, with the effect that the trailing end would be moved upwards, which is equivalent to reducing the distance of the upper edge of the trailing side walls. This tipping effect is counteracted according to the invention in that the leading end of the transport crate is controllable, namely is actively raised, as soon as the transport crate reaches the tipping point. Raising the leading end of the transport crate has the result that the bottom wall at the trailing end of the transport crate permanently retains contact with the guide rails, so that the distance $A_B$ in the region of the trailing end is kept constant during the entire ejection process. The trapping risk, with the advantages already mentioned, is thereby reduced.

Particularly preferably, the receiving device is adjustable at least in sections in order to change the height position and/or the angular position of the receiving device in relation to the ejection position of each transport crate. The height position describes the up and down movement of the entire section of the receiving device that receives a transport crate. Changing the height position thus affects the entire section. As a result, it is possible to position the receiving device with its upper side, which defines the receiving plane $E_{A2}$, above or below the ejection plane $E_{A1}$, which is defined by the supporting surfaces of the guide rails for the transport crate in the ejection position. The change of the angular position describes the one-sided up and down movement of the entire section receiving a transport crate, such that the receiving plane $E_{A2}$ is at a (changeable) angle $\alpha$ to the ejection plane $E_{A1}$ and intersects it. Because the height position and the angular position can be adjusted individually/separately or in combination/superimposed, an individual adjustment of the position of the receiving device at the unloading station and thus an optimised adjustment of the position of the receiving device at the transport crate situated in the ejection process is possible. By means of this further development according to the invention, each transport crate can be "twisted" from the rack while maintaining the optimum distances (corresponding to the greatest possible distances) from the cover. In other words, the configuration according to the invention allows the transport crates to be influenced directly so that positional changes/distance changes, brought about by the ejection process, of the transport crates relative to the cover within the rack can be compensated for, as a result of which the live poultry is better protected.

An advantageous embodiment is characterised in that the receiving device has a first entry side facing the unloading station and a second exit side remote from the unloading station, wherein the receiving device has an associated adjustment mechanism by means of which at least the second exit side of the receiving device remote from the unloading station is formed and configured to be movable up and down. The height/level and the angular position of the receiving device can thus be changed in order to change the position of the transport crate during the ejection operation. This possibility for adjustment allows the position of a transport crate in relation to the cover to be controlled in a particularly simple manner in the vertical position during the ejection operation. By raising and lowering the exit side of the receiving device, that is to say changing the angle α between the planes $E_{A1}$ and $E_{A2}$, the orientation of the receiving plane $E_{A2}$ relative to the ejection plane $E_{A1}$ can be changed in order, as it were, to pick up the transport crate already partially ejected from the rack and bring it into a position in which the trailing end of the transport crate is maintained for as long as possible in the position of maximum distance from the cover. There can be used as the adjustment mechanism purely mechanical solutions, such as, for example, cam controls, or electronic, hydraulic or pneumatic solutions, as well as combination solutions.

The receiving device is expediently formed and configured to be movable up and down on both sides by means of the adjustment mechanism. By improving or increasing the number of possible adjustments of the receiving device, individual movement sequences of the transport crates during the ejection operation can be achieved. In particular, it is possible to move the receiving device further downwards immediately after the transport crates have been transferred from the rack fully, in order to achieve maximum headroom and keep the transfer of the trailing end of the transport crate from the rack to the receiving device as short as possible.

A particularly preferred further development is characterised in that the unloading system comprises a control device which is formed and configured for controlling the adjustment mechanism according to the position of each transport crate within the rack during the ejection operation. The control device can be mechanical, electronic, hydraulic or pneumatic or a combination thereof. In other words, means are provided as the control device by means of which the adjustment mechanism can be controlled/operated during the ejection operation on the basis of the position of the transport crate within the rack. These means can be formed, for example, by an eccentric-driven pivot arm, timers, tachometers or sensors. With the aid of this control device, a precisely adapted movement path of the transport crate during the ejection operation can be achieved, in order to maintain the greatest possible distance between the upper edge of the trailing side walls and the cover and thus improve the protection of the live poultry.

The receiving device advantageously comprises a receiving table for receiving the transport crates during the ejection operation, which receiving table is formed and configured to be adjustable in respect of its height position and/or its angular position by means of the adjustment mechanism. The receiving table describes a synonym for a support, which can be formed, for example, of a closed belt, a single chain drive, a double chain drive, a plurality of transport rollers arranged side by side and at a distance from one another, or the like. The transport crates can thereby be transferred from the rack particularly simply and precisely.

A preferred further development is characterised in that the receiving table is formed of a plurality of transport rollers which are arranged parallel to and at a distance from one another and which can be driven in rotation by means of a drive means. These transport rollers are oriented with their axis of rotation either transverse to the pushing direction S or in the pushing direction S. A plurality of these transport rollers form the section of the receiving device that is adjustable in order to change the height position and/or the angular position. To that end, the transport rollers can be arranged, for example, on a common movable frame. The transport rollers can also be adjustable individually. By means of suitable control means, the individual transport rollers can also be movable synchronously. The transport crates which have been fully ejected from the rack can be conveyed to further processing by means of the drive means.

The receiving table is particularly preferably formed of at least two chain drives which are arranged at a distance from one another and can be driven by means of a drive means. These chain drives have a conveying direction in the pushing direction S. This provides a structurally particularly simple solution for receiving the transport crates and guiding them out of the rack on an individual movement path. A particular advantage is that the chain drives driven in the pushing direction S are able to assist with the ejection of the transport crates by "pulling" the transport crates out of the rack in support of the pushing device. The ejection process can thereby be optimised in terms of function and time.

An advantageous further development is characterised in that the receiving table has an associated conveying table for conveying away the fully ejected transport crates, wherein the conveying table and the receiving table are movable relative to one another at least in the vertical direction by means of at least one drive means and have different conveying directions. This further development according to the invention allows the transport crates to be conveyed either in the pushing direction S or transversely to the pushing direction S.

The conveying table is expediently formed of a plurality of transport rollers which are arranged parallel to and at a distance from one another and are fixed in position and which can be driven in rotation by means of a drive means. The functionality of conveying transversely to the pushing direction is thus associated with the feed table, while the receiving table is associated with receiving the transport crates from the rack and conveying the transport crates in the pushing direction S. A structurally simple solution is thereby provided for combining the functionalities of receiving the transport crates from the rack, on the one hand, and conveying the transport crates placed on the receiving device in different directions, on the other hand. Further advantageous options will be described hereinbelow.

A preferred embodiment is characterised in that the unloading station has an associated lifting unit for vertically moving the rack into the respective ejection position for the transport crates. This lifting unit is of importance in particular when the transport unit comprises a rack having at least two transport crates mounted one on top of the other. The bottommost transport crate can then be moved into the ejection position, in which the transport crate can be moved out of the rack by means of the pushing device. Unloading of the rack from bottom to top, starting with the bottommost transport crate, is thereby ensured. The configuration optionally also permits simultaneous unloading of all the transport crates in a stack. Unloading in a stack can also take place in a time-delayed/staggered manner. To that end, the transport crates are to be ejected offset in stages with a pushing sequence from stack plane to stack plane, starting with the bottommost stack plane. As a result, the transport crates of a transport unit are then situated on the receiving device stacked directly on top of one another.

The pushing device advantageously comprises at least one pusher for ejecting a single transport crate or a plurality of transport crates. The pusher can have a push arm by means of which the transport crate situated in the ejection position, preferably the transport crate situated in the bottommost stack plane, can be ejected. The pusher can also have a plurality of push arms, corresponding to the number of stack planes, in order simultaneously to eject a plurality of transport crates mounted one above the other. Furthermore, the pusher can also have a plurality of push arms which can be controlled independently of one another, by means of which the ejection in stages of a plurality of transport crates situated one above the other is ensured.

The object is also achieved by a method having the steps mentioned hereinbefore in that the position of each transport crate situated in the ejection position in relation to the cover is actively controlled in the vertical direction during the entire ejection operation, in such a manner that the maximum distance $A_B$ between the upper edge K of the trailing side walls of each transport crate in the pushing direction S and the cover is maintained during the ejection operation dependent on the position of the transport crate within the rack. The invention accordingly permits controlled ejection of the transport crates from the rack in order to protect the poultry and avoid injuries.

The leading end of each transport crate in the pushing direction S is preferably first raised by the pushing of the transport crate in the pushing direction S against a transport restraint of the rack in the form of a cross-member, whereby the transport crate, at the latest when at least half the transport crate has been ejected from the rack, is received by its crate bottom by the receiving device and pressed upwards, by the receiving device being guided upwards, to such an extent that the upper edge K of the trailing side walls of the transport crate in the pushing direction S is kept at a maximum distance $A_B$ from the cover until it reaches the cross-member, along which it slides.

A preferred further development is characterised in that the transport crate is moved downwards, by the receiving device being guided downwards, as soon as it has been ejected fully from the rack and the crate bottom of the transport crate has passed over and left the cross-member, along which it slides, in order to increase the distance between the upper edge of the trailing side walls of the transport crate and the cross-member of the rack situated above it.

The transport crates situated fully on the receiving device are expediently conveyed further either in the pushing direction S or transversely to the pushing direction S.

An advantageous embodiment is characterised in that the receiving device is controlled automatically during the ejection operation by means of a control device in dependence on the position of each transport crate within the rack.

The receiving device is advantageously moved up and/or down by means of the control device either on the side facing the unloading station and/or on the side remote from the unloading station, so that each transport crate is guided during the ejection operation along an individual movement path while retaining the maximum distance $A_B$ between the upper edge K of the trailing side walls of the transport crate and the cover.

A particularly preferred further development is characterised in that a plurality of transport crates arranged one above the other in a rack are ejected from the rack by means of the pushing device simultaneously or in a staggered manner relative to one another, in such a manner that the transport crates of a transport unit are situated directly on top of one another in a stack on the receiving device. The transport crates can therefore be unloaded either in succession from bottom to top, or vice versa, or in stacks, whereby in the case of unloading in stacks all the transport crates of a stack are ejected simultaneously or in succession in a staggered and mutually overlapping manner.

Further advantages which arise from the method according to the invention have already been explained in detail in connection with the unloading system according to the invention, so that reference is made to the corresponding passages in order to avoid repetition.

Further expedient and/or advantageous features and further developments as well as preferred method steps will become apparent from the dependent claims and the description. Particularly preferred embodiments of the unloading station and the method will be explained in greater detail by means of the accompanying drawing, in which:

FIG. 12 is a further view of the receiving device according to FIG. 11.

Figure 1:
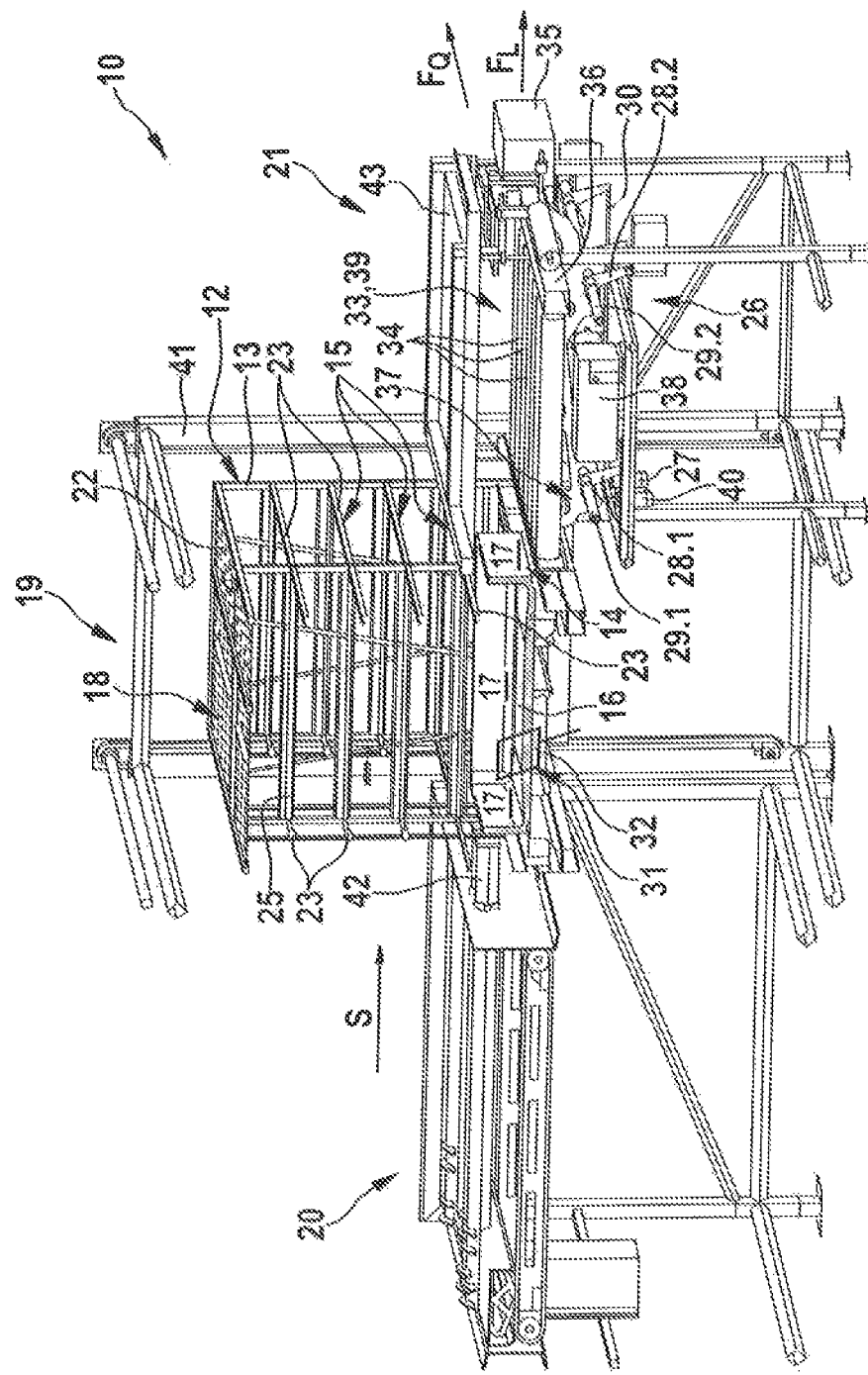
FIG. 1 is a schematic perspective view of an unloading system according to the invention.

The unloading system shown in the drawing is used for unloading a plurality of transport crates mounted one above the other in a rack and filled with live poultry, starting with the bottommost transport crate. However, the unloading system according to the invention is equally suitable and formed for unloading a plurality of transport crates of one or more transport units in stacks—simultaneously or staggered over a period of time.

The drawing, in particular FIGS. 1 to 4, shows an unloading system 10 which is formed and configured for unloading at least one transport unit 12 configured for transporting and/or storing live poultry 11. Each transport unit 12 has at least one rack 13 and at least one transport crate 14 mounted therein for receiving the poultry 11. The rack 13 comprises a transport restraint 15 for each transport crate 14. Each open-top transport crate 14 has a crate bottom 16 and peripheral side walls 17. Each transport crate 14 mounted in the rack 13 is covered at the top by a cover 18 which is arranged at a distance from the upper edge K of the side walls 17. The unloading system 10 comprises an unloading station 19 for at least one transport unit 12, at least one transport unit 12, a pushing device 20 for ejecting each transport crate 14 situated in an ejection position from the rack 13 in the pushing direction S, and a receiving device 21 for receiving and conveying each transport crate 14 ejected from the rack 13.

As mentioned, the transport unit 12 comprises according to the invention at least one transport crate 14. In the preferred embodiment shown, a plurality of transport crates 14 mounted one above the other are part of a transport unit 12, the bottommost transport crate 14 in each case being in the ejection position. Deviating from the embodiment shown, the ejection position may also vary. In particular, all the transport crates 14 of a transport unit 12 or transport crates 14 of a plurality of adjacent transport units 12 can also be in an ejection position simultaneously.

The unloading station 10 is characterised according to the invention in that the position of each transport crate 14 situated in the ejection position in relation to the cover 18 can be controlled in the vertical direction during the entire ejection operation, in such a manner that the maximum distance $A_B$ between the upper edge K of the trailing side walls 17 of each transport crate 14 in the pushing direction S and the cover 18 can be maintained during the ejection operation dependent on the position of the transport crate 14 within the rack 13. In other words, the unloading system 10 has means with which each transport crate 14 situated in the ejection position can be moved additionally to the pushing device 20, the pushing device 20 being formed and configured substantially for horizontal movement, while said means are formed and configured for vertical movement. The means allow changes in the distance between the upper edge K of the side walls 17 and the cover 18, caused by the ejection operation, to be compensated for by influencing the movement path of the transport crates 14 during the ejection operation. The means can be associated with the pushing device 20, the unloading station 19 and in particular the receiving device 21 (see below).

Figure 2:
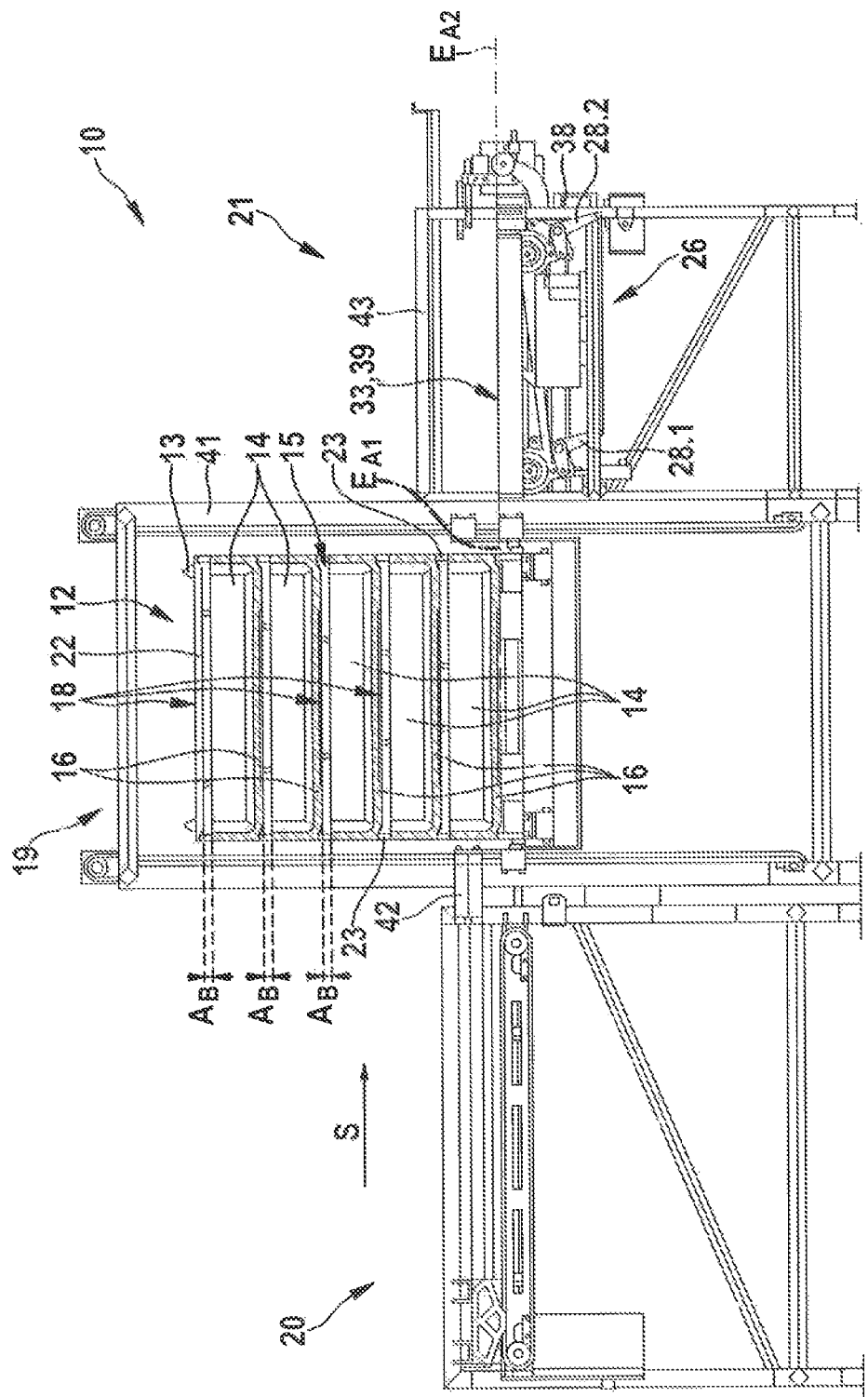
FIG. 2 is a front view of the unloading system according to FIG. 1 with the bottommost transport crate in the ejection position before the ejection operation.
Figure 3:
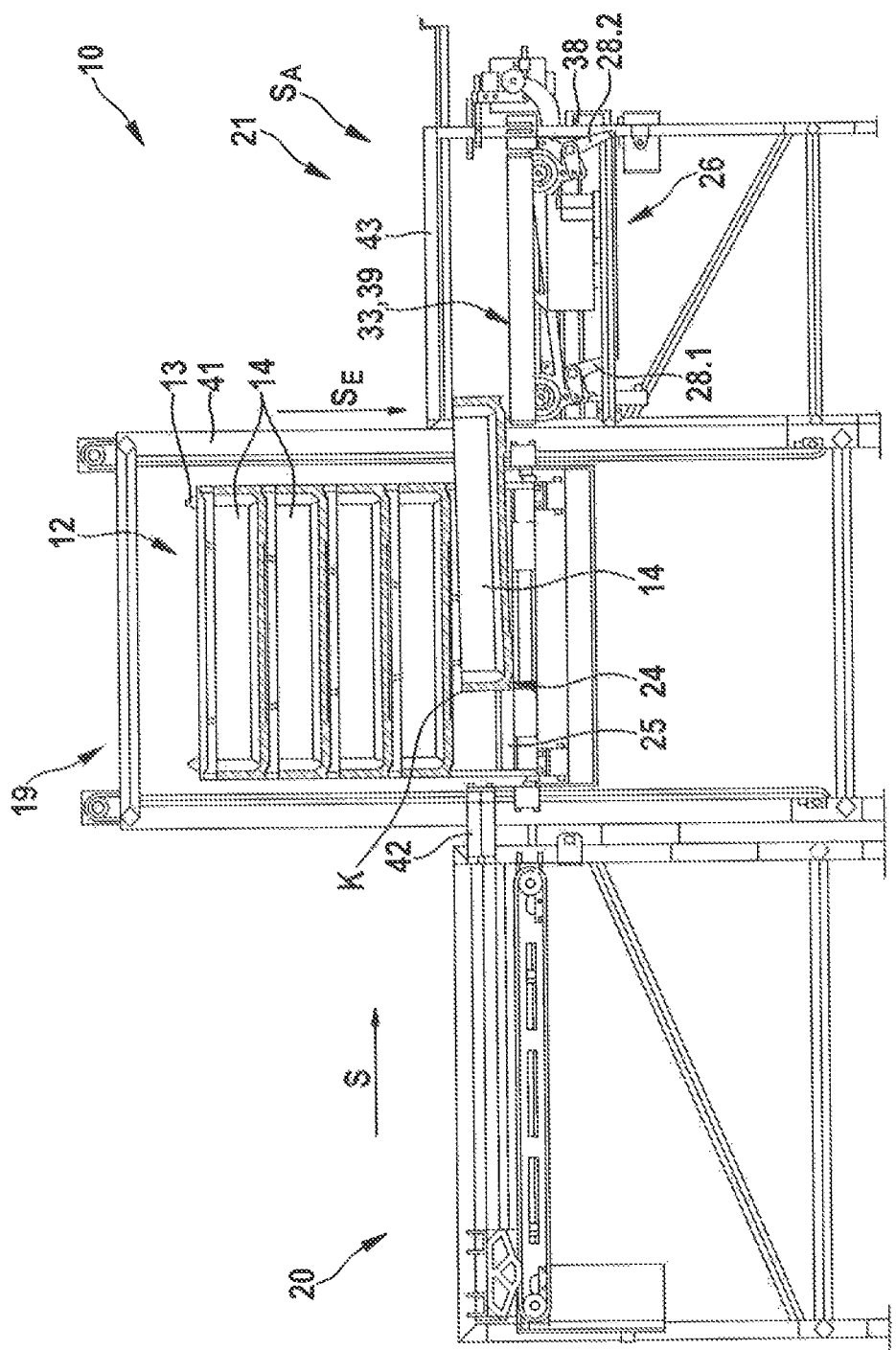
FIG. 3 shows the unloading system according to FIG. 2 with the bottommost transport crate during the ejection operation.
Figure 4:
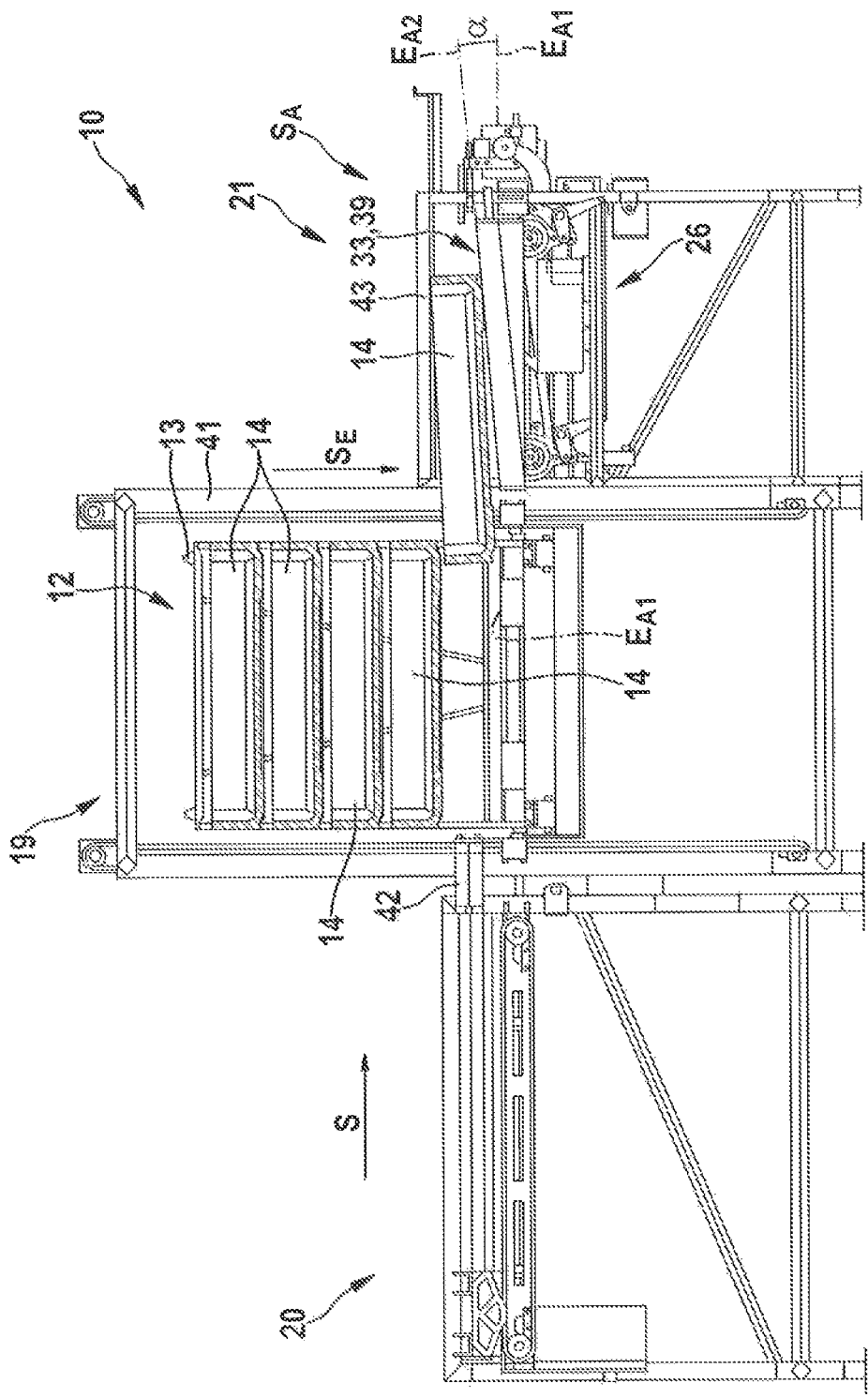
FIG. 4 shows the unloading system according to FIG. 2 with the bottommost transport crate shortly before completion of the ejection operation.
Figure 5:
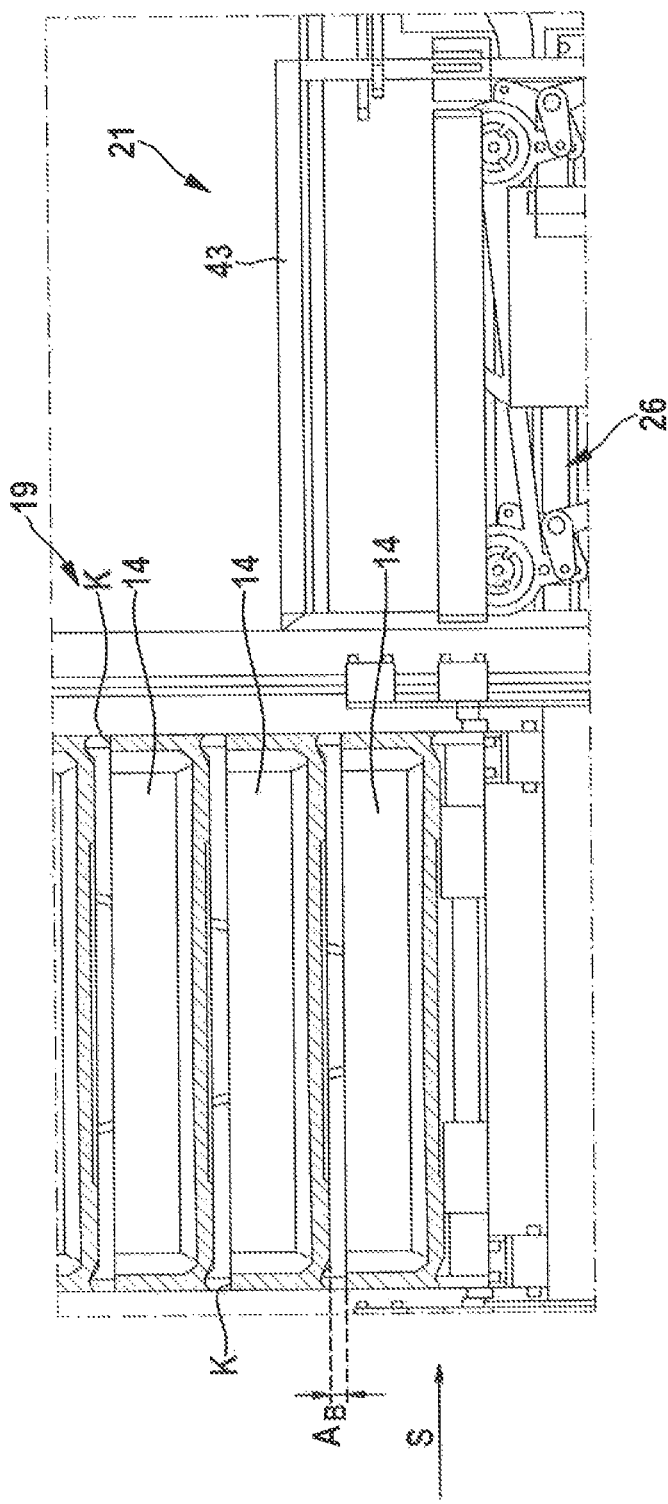
FIG. 5 is an enlarged view of the unloading station with the receiving device, wherein the bottommost transport crate is in the ejection position before the ejection operation.
Figure 6:
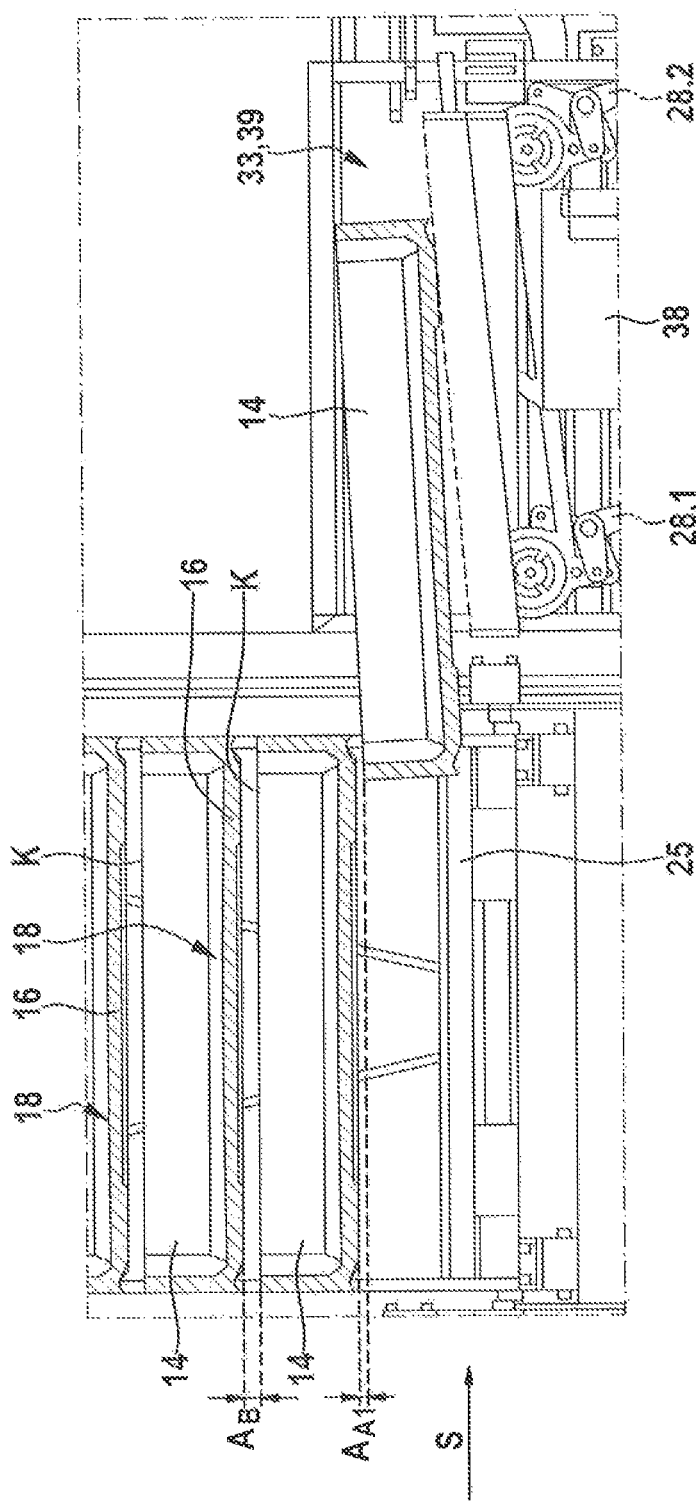
FIG. 6 shows the unloading station with the receiving device according to FIG. 5, wherein the bottommost transport crate is shortly before completion of the ejection operation.

The maximum distance $A_B$ is the (base) distance between the upper edge K of the side walls 17 and the cover 18 located above them. In FIG. 2, there are optionally five transport crates 14 mounted one above the other in a stack in the rack 13, namely in the original transport or storage position of the transport crates 14 in the rack 13, that is to say before the start of the ejection operation, a gap with the distance $A_B$ being formed between the upper edge K of the side walls 17 and the respective cover 18 located above them.

The features and further developments and also method steps described hereinbelow represent preferred embodiments, taken on their own or in combination with one another. It is expressly pointed out that features and method steps which are combined in the claims and/or the description and/or the drawing or which are described in a common embodiment can also functionally independently develop further the unloading station described above and the method described below.

Each transport unit 12 is preferably of quadrangular form. Other geometric forms which permit space-saving transportation and storage are likewise possible. Each rack 13 is formed and configured to receive at least two transport crates 14 arranged one above the other. The transport crates are preferably likewise of quadrangular form. As mentioned, five transport crates 14 are arranged one above the other in the embodiment shown. The number of transport crates 14 arranged one above the other can vary. It is also possible to provide racks 13 which are formed and configured to receive two or more adjacent stacks of two or more transport crates 14. In a stack formed of transport crates 14, the crate bottom 16 of one transport crate 14 forms the cover 18 for the transport crate 14 mounted beneath it, and the transport crate 14 mounted in the topmost position in the rack 13 is covered by a lid element 22 associated with the rack 13 as the cover 18.

The rack 13 comprises a first rack side facing the pushing device 20 and a second rack side, opposite the first rack side, facing the receiving device 21. On both rack sides, the rack 13 further comprises cross-members 23 oriented transversely to the pushing direction S of the transport crates 14 as transport restraints 15 for each transport crate 14, which cross-members cooperate with corresponding mouldings 24 in the crate bottom 16 of each transport crate 14. The rack 13 further comprises for each transport crate 14 guide rails 25 for guiding the transport crates 14 within the rack 13, which guide rails are arranged laterally on the rack 13 parallel to the pushing direction S of the transport crates 14. The vertical distance A between the cross-members 23 arranged one above the other, on the one hand, and between the topmost cross-members 23 and the lid element 22 of the rack 13, on the other hand, is greater than the total height of a transport crate 14 at least on the second rack side facing the receiving device 21. This structural configuration permits safe transport on the one hand and simple ejection on the other hand.

The mouldings 24 in the crate bottom 16 are preferably bevels which extend over the entire width of the transport crates 14 transversely to the pushing direction S and run obliquely upwards starting from the lower bottom face of the crate bottom 16. The transport crates 14 thus have ramp-like mouldings 24 on both rack sides. The transport crates 14 rest on the cross-members 23 with the bevels. In the original transport or storage position before the ejection operation (see, for example, FIG. 2), the transport crates 14 rest laterally on the guide rails 25 and on both rack sides on the cross-members 23. If a load is exerted on the transport crates 14, preferably by the pushing device 20, the transport crate 14 slides with its leading end on its bevel upwards onto the cross-member 23, so that the transport crate 14 slides along the cross-member 23 with its crate bottom 16 and is higher at the leading end than at its trailing end (see, for example, FIG. 3). The upper edge K of the trailing side wall 17 continues to be at the maximum distance $A_B$ from the cover 18, in the embodiment shown from the crate bottom 16 located above it.

Particularly preferably, the receiving device 21 is adjustable at least in sections in order to change the height position and/or the angular position of the receiving device in relation to the ejection position of each transport crate 14. In this case, the means for controlling the transport crates 14 is associated with the receiving device 21, or the receiving device 21 is itself the means for controlling the transport crates 14. As mentioned, the receiving device 21 can have an adjustable section. The receiving device 21 is optionally movable as a whole, but preferably at least in respect of its supporting surface. The adjustable section preferably extends transversely to the pushing direction S over the entire width of the transport crates 14, so that the transport crates 14 can be transferred safely from the rack 13. The receiving device 21 has a first entry side $S_E$ facing the unloading station 19 and a second exit side $S_A$ remote from the unloading station 19, the receiving device 21 having an associated adjustment mechanism 26 by means of which at least the second exit side $S_A$ of the receiving device 21 remote from the unloading station 19 is formed and configured to be movable up and down.

For adjustment of the height position, the receiving device 21, or at least the adjustable section, can be adjusted on the entry side $S_E$ and the exit side $S_A$ simultaneously. The height level of the receiving device 21 can thus be varied. For adjustment of the angular position, the receiving device 21, or at least the section, can be adjusted either on the entry side $S_E$ or on the exit side $S_A$. The inclination of the receiving device 21 can thus be varied. A superimposed movement for adjusting the height position and the angular position is also provided. The adjustment movements take place relative to the ejection position of each transport crate 14, or relative to the transport crate 14 itself, so that the adjustment movements can be transmitted to the transport crate 14 that is in the ejection process. In other words, the supporting surface of the receiving device 21, or of the adjustable section, can be moved vertically relative to the ejection plane $E_{A1}$ and thus towards or away from the transport crate 14 that is in the ejection operation and also adjusted in respect of its inclination relative to the transport crate 14.

As mentioned, the adjustment mechanism 26 is formed and configured to adjust the receiving device 21, or the adjustable section, on one side, in particular on the exit side $S_A$ of the receiving device, in order to change in particular the inclination or the angle of inclination a between the ejection plane $E_{A1}$ and the receiving plane $E_{A2}$. Preferably, however, the adjustment mechanism 26 is formed to move the receiving device 21, or the adjustable section, up and down on both sides, namely on both sides simultaneously or on both sides independently of one another, in order to change the inclination/angular position and the height position. In other words, the adjustment mechanism 26 serves to move the receiving device 21, or the adjustable section, from an upper position into a lower position and vice versa, and to move the receiving device 21, or the adjustable section, from a horizontal position into a position sloping upwards in the pushing direction S and vice versa. To that end, the adjustment mechanism 26 can comprise a drive means 27 or a plurality of drive means 27 which can be operated synchronously or independently of one another.

Figure 11:
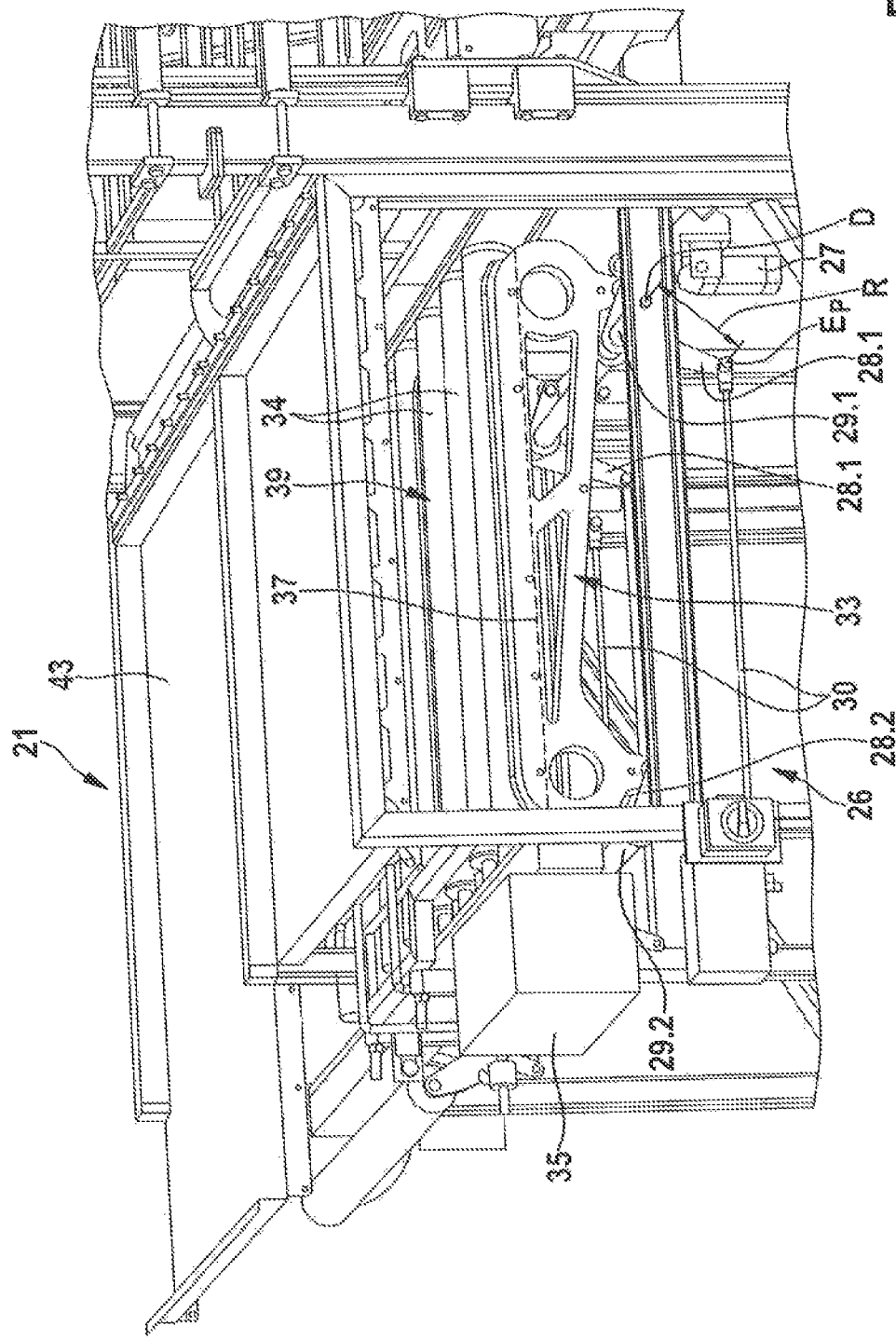
FIG. 11 is a schematic perspective view of the receiving device.

There can be used as the adjustment mechanism 26, for example, at least one lever or pivot arm 28.1 which is pivotably arranged on a pivot axis 29.1 and functions as an eccentric. In FIG. 11, the pivot axis 29.1 is associated with the entry side $S_E$ of the receiving device 21. A pivot axis 29.2 having corresponding lever or pivot arms 28.2 is likewise provided on the exit side $S_A$ of the receiving device 21. The lever or pivot arms 28.1, 28.2 can be formed with the same or different transmission/pitch R (distance from the midpoint of the axis of rotation D of the pivot axis to the eccentric point $E_P$). The pivot axes 29.1, 29.2 can be arranged and operated separately. In the embodiment shown (see, for example, FIG. 11), the pivot axes 29.1, 29.2 are connected together by means of at least one, preferably two coupling rods 30 or the like. The length of the or each coupling rod 30 can vary in dependence on the required lifting stroke. Other structural solutions of the mechanical, hydraulic, pneumatic and electronic type as well as combination solutions thereof can of course likewise be used as the adjustment mechanism 26, for example in the form of controlled pneumatic or hydraulic cylinders, step motors or the like.

For controlling the adjustment mechanism 26, the unloading system 10 comprises a control device 31 which is formed and configured to control the adjustment mechanism 26 in dependence on the position of each transport crate 14 inside the rack 13 during the ejection operation. The control device 31 can be produced, or formed and configured, in different ways. For example, a mechanical coupling of the adjustment mechanism 26 to the pushing device 20 can be provided, so that the adjustment of the receiving device 21 can be carried out by means of or via the pushing device 20. Electronic coupling or control of the receiving device 21 or of the adjustment mechanism 26 is further possible. To that end, the control device 31 comprises, for example, timers, tachometers, sensors or other detection means, by means of which each position of the transport crate 14 can be determined and evaluated, for example by means of a control unit 32, during the ejection operation, so that the adjustment mechanism 26 can be operated in dependence on the position of the transport crate 14. As well as associating the control device 31 with the pushing device 20, the control device 31 may also be associated with the unloading station 19 and/or with the receiving device 21 itself. Sensors, for example, can be arranged in the region of the unloading station 19, by means of which sensors the position of the transport crates 14 can be determined and evaluated for control purposes during the ejection process. Sensors can also be provided in the region of the receiving device 21, by means of which sensors the horizontal position of the transport crates 14 and/or the progress of the ejection operation is monitored, for example. Other monitoring or detection systems can likewise be used and can be variable in respect of their positioning in the unloading system 10.

The receiving device 21 preferably comprises a receiving table 33 for receiving the transport crates 14 during the ejection operation, which receiving table is formed and configured to be adjustable by means of the adjustment mechanism 26 in respect of its height position and/or its angular position. The receiving table 33 forms the movable section of the receiving device 21.

A first, simple embodiment (not shown explicitly) of the receiving table 33 is formed by a flat belt conveyor or a transport chain. A further, preferred embodiment of the receiving table 33 is formed of a plurality of transport rollers 34 which are arranged parallel to and at a distance from one another and can be driven in rotation by means of a drive means 35. The transport rollers 34 can be individually adjustable. The transport rollers 34 are preferably arranged on a frame 36 which is adjustable. The transport rollers 34 can be oriented, for example, according to FIG. 1 with their axis of rotation $R_T$ in the pushing direction S (for conveying the transport crates 14 transversely to the pushing direction S) or transversely to the pushing direction S (for conveying the transport crates 14 in the pushing direction S). The receiving table 33 for supporting and controlling the transport crates 14 during the ejection process is at the same time a conveying table for conveying the fully ejected transport crates 14 situated on the transport rollers 34.

A further, preferred embodiment of the receiving table 33 provides that the receiving table is formed of at least one chain drive 37, but preferably of at least two chain drives 37 arranged at a distance from one another, which can be driven by means of at least one drive means 38. The two chain drives 37 are preferably adjustable synchronously by means of the adjustment mechanism 26. The axes of rotation $R_U$ of the deflecting or drive wheels for the chain drives 37 are preferably oriented transversely to the pushing direction S, so that the drive and conveying direction of the chain drives 37 is oriented in the pushing direction S. The transport crates 14 received by the receiving table 33 can then be conveyed further in the pushing direction S. The receiving table 33 for supporting and controlling the transport crates 14 during the ejection process is at the same time a conveying table for conveying the fully ejected transport crates 14 situated on the chain drives 37.

The receiving table 33 particularly preferably has an associated separate conveying table 39 for conveying away the fully ejected transport crates 14, the conveying table 39 and the receiving table 33 being movable relative to one another at least in the vertical direction by means of at least one drive means 40 and having different conveying directions. For all embodiments, the receiving table 33 can be formed as the conveying table 39 and the conveying table 39 as the receiving table 33. In other words, the chain drives 37 can serve as the receiving table 33 for supporting and controlling the transport crates 14 during the ejection process, while the transport rollers 34 serve as the conveying table for conveying the fully ejected transport crates 14, and vice versa. The functionalities of the receiving table 33 and the conveying table 39 can, however, be interchanged or varied according to the application.

In a particularly preferred embodiment, which is shown in the drawing, the receiving table 33 is formed by the two chain drives 37, the axes of rotation $R_U$ of the deflecting or drive wheels for the chain drives being oriented transversely to the pushing direction S. This receiving table 33 is adjustable in the manner described above in order to support, control and fully receive the transport crate 14 or the stack of transport crates 14 during the ejection process. During the ejection process, the receiving table 33 serves to control the transport crate or crates 14 in the vertical direction, in order to maintain the maximum distance between the upper edge K of the trailing side walls 17 and the cover 18 (that is to say crate bottom 16 or lid element 22). The conveying table 39 is formed of a plurality of transport rollers 34 which are arranged parallel to and at a distance from one another and are fixed in position, and which can be driven in rotation by means of a drive means 35, In other words, the transport rollers 34 in this embodiment are permanently oriented and arranged in a substantially horizontal plane and are formed and configured solely to convey the transport crates 14 which have been fully ejected from the rack 13. The horizontal orientation of the axis of rotation $R_T$ runs in the pushing direction S.

In further embodiments, the adjustable receiving table 33 can be formed by the transport rollers 14, while the conveying table 39 is formed by the chain drives 37, which are then fixed in position. A lifting device can be operated by the or each drive means 40, so that the surface of the receiving table 33 can lie either above or below the surface of the conveying table 39. The receiving table 33 and the conveying table 39 may also have their own associated lifting devices with a separate drive means 40. All the receiving tables 33 and/or conveying tables 39, irrespective of their configuration and allocated function, have an associated cover 43 for covering the transport crates 14 at the top.

In particular for the case where the rack 13 is formed and configured to receive two or more transport crates 14 one above the other, the unloading station 19 has an associated lifting unit 41 for vertically moving the rack 13 into the ejection position for the transport crates 14. By means of the lifting device 41, the transport crates 14 arranged one above the other can be brought in succession into their ejection position. The receiving device 21 may optionally additionally be formed to be height-adjustable in order to move the receiving table 33/conveying table 39 up and down, in such a manner that the receiving device 21, starting from the top or the bottom, can gradually be moved into the individual planes of the transport crates 14 of a stack in order to receive them.

For ejecting a single transport crate 14 or a plurality of transport crates 14, the pushing device 20 comprises at least one pusher 42. The pusher can have a single push arm for ejecting a single transport crate 14. The pusher 42 may optionally also be equipped with a plurality of push arms, for example corresponding to the number of stack planes. In the case where all the push arms are fixedly arranged on the pusher 42, operation takes place by means of a common pusher drive. Alternatively, the push arms can also be formed separately, so that each push arm has its own associated pusher drive, it being possible for the pusher drives to be operated in coordination with one another by means of a control means.

The rack 13 can also be formed and configured to receive and store a plurality of adjacent stacks of a plurality of transport crates 14. It is also possible for a plurality of adjacent racks 13 to be arranged in the unloading station 19, which racks can be unloaded in succession or simultaneously.

The method will be explained in greater detail hereinbelow with reference to the drawing:

The invention relates to methods for unloading at least one transport unit 12 which is configured for transporting and/or storing live poultry and has at least one rack 13 and at least one transport crate 14 mounted therein for receiving the poultry, wherein each open-top transport crate 14 has a crate bottom 16 and peripheral side walls 17 and each transport crate 14 mounted in the rack 13 is covered at the top by a cover 18 which is arranged at a distance from the upper edge K of the side walls 17. For the unloading of such a transport unit 12 it is first necessary to introduce at least one transport unit 12 into an unloading station 19. At least one transport crate 14 situated in the ejection position is then ejected from the rack 13 in the pushing direction S by means of a pushing device 20. Finally, each transport crate 14 ejected from the rack 13 is received and conveyed by means of a receiving device 21. A plurality of transport crates 14 of a stack are ejected fully in succession, for example from bottom to top, so that a single transport crate 14 is located on the receiving device 21 and is conveyed in the pushing direction S or transversely to the pushing direction S for further processing. All the transport crates 14 of a stack may optionally also be ejected simultaneously or staggered over a period of time, so that ultimately a stack of transport crates 14 is situated on the receiving device 21 and conveyed in the pushing direction S or transversely to the pushing direction S for further processing.

According to the invention, the position of each transport crate 14 situated in the ejection position in relation to the lid 18 is actively controlled in the vertical direction during the entire ejection operation, in such a manner that the maximum distance $A_B$ between the upper edge K of the trailing side walls 17 of each transport crate 14 in the pushing direction S and the cover 18 is maintained in dependence on the respective position of the transport crate 14 within the rack 13 during the ejection process. More specifically, each transport crate 14 is so controlled on a movement path that its trailing end slides on the guide rails 25 of the rack 13 for as long as possible, in order to maintain the distance $A_B$.

Firstly, a transport crate 14, or, as in FIG. 2, for example, a plurality of transport crates 14 one above the other, is located in the rack. In the embodiment shown, the transport crates 14 form a stack, the bottommost transport crate 14 being in the ejection position. All the transport crates 14 are in their original transport and storage position within the rack (see FIG. 2) prior to their ejection operation. In the ejection operation, the leading end in the pushing direction S of each transport crate 14 is first raised by the pushing of the transport crate 14 in the pushing direction S against a transport restraint 15 of the rack 13 in the form of a cross-member 23 (see FIG. 3). The transport crate 14 in the ejection process slides with its trailing end with the crate bottom 16 on the guide rails 25, so that the upper edge K at least of the trailing side wall 17 is at the maximum distance $A_B$ from the transport crate 14 located above it. Upon ejection, the transport crate 14 slides with its crate bottom 16 on the cross-member 23. As soon as approximately half the transport crate 14 has been ejected from the rack 13, the transport crate 14 reaches a tipping point. At the latest when at least half the transport crate 14 has been ejected from the rack 13, the transport crate 14 is received by its crate bottom 16 by the receiving device 21 (see FIG. 4) and pressed so far upwards, by the receiving device 21 being guided upwards, that the upper edge K of the trailing side walls 17 of the transport crate 14 in the pushing direction S is maintained at a maximum distance $A_B$ from the cover until it reaches the cross-member 23, on which it slides. Control of the receiving device 21 comprises changing the height position and/or the angular position. To put it simply, the transport crate 14 ascends a kind of ramp during the ejection process, so that the trailing end of the transport crate 14 is permanently situated at the lowest point, namely in contact with the guide rails 25, until the crate is finally ejected.

As soon as the transport crate 14 has been fully ejected from the rack 13, in particular after the bottom surface of the crate bottom 16 of the transport crate 14 has passed over and left the cross-member 23 on which it slides (the transport crate 14 lies with its moulding 24, that is to say the bevel at the trailing end of the transport crate 14, still on the cross-member 23), the receiving device 21 is moved downwards in order to increase the distance between the upper edge K of the trailing side walls 17 of the transport crate 14 and the cross-member 23, located above it, of the rack 13, by the receiving device 21 being guided downwards at least on the side facing the rack 13. On completion of the ejection operation, the transport crate 14 or the stack formed of transport crates 14 is located fully on the receiving device 21 and can be conveyed further either in the pushing direction S or transversely to the pushing direction S.

The entire ejection operation is controlled automatically. As well as controlling the pushing device 20, the receiving device 21 is controlled automatically by means of a control device 31 in dependence on the position of each transport crate 14 within the rack 13 during the ejection operation. The movement, or the movement path, of each transport crate 14 is thus influenced not only by the ejection process but actively also by the receiving device 21. Because the receiving device 21 is moved up and/or down by means of the control device 31 either on the side facing the unloading station 19 and/or on the side remote from the unloading station 19, so that each transport crate 14 is guided along an individual movement path during the ejection operation while maintaining the maximum distance $A_B$ between the upper edge K of the trailing side walls 17 of the transport crate 14 and the cover 18, unloading takes place in a manner which protects the poultry 11.

Figure 7:
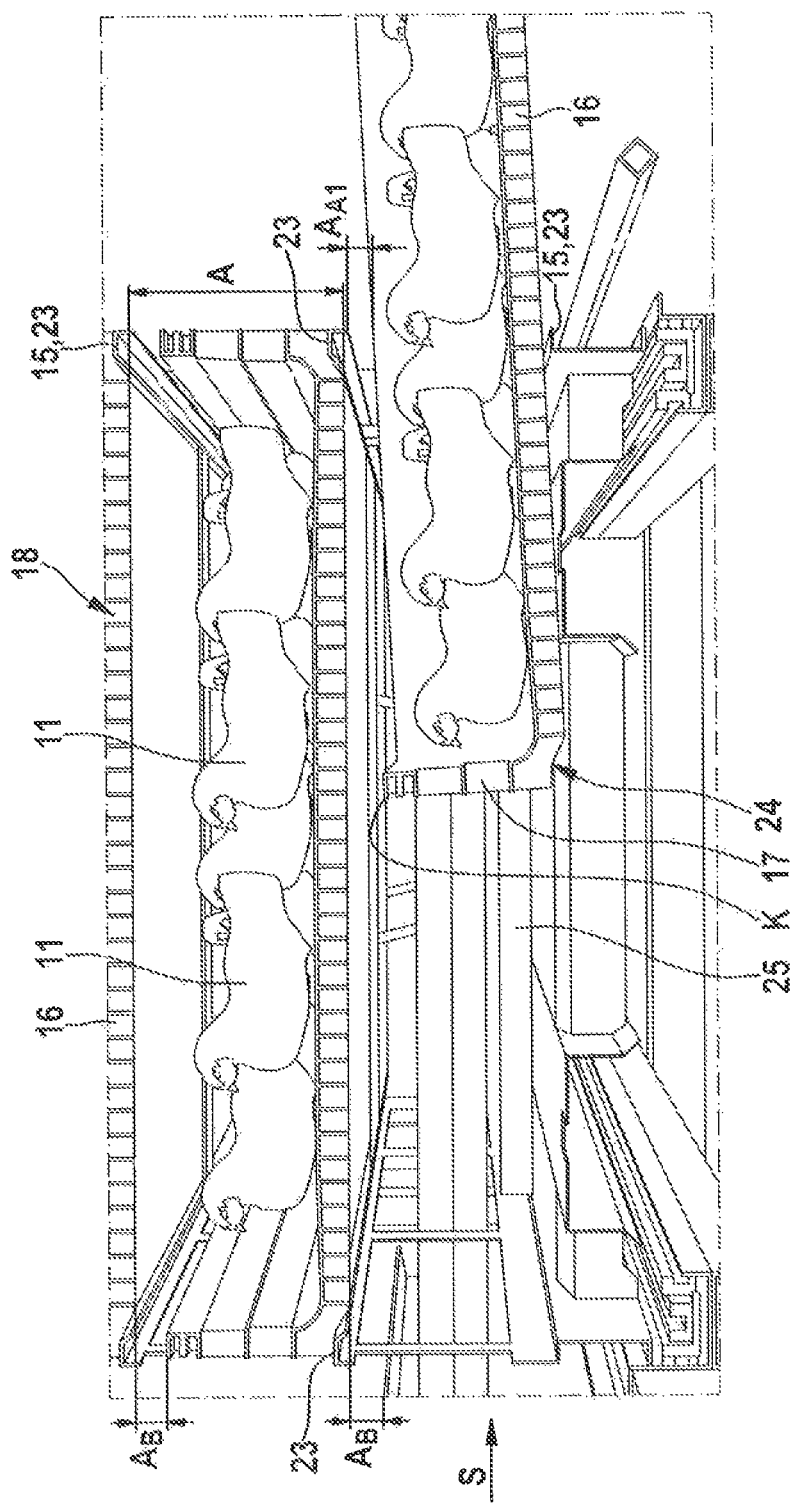
FIG. 7 is a schematic sectional view of the unloading station, wherein the bottommost transport crate is in the ejection operation.

The principle of the method according to the invention can be seen clearly in particular with reference to FIGS. 7 to 10. Two transport crates 14 arranged one above the other are shown. One transport crate 14, in FIG. 7 the upper transport crate 14, is in its original transport and storage position and is resting on the guide rails 25 and the cross-members 23. Between the cross-members 23, arranged one above the other, of the rack 13 there is formed a distance A which is greater than the height of the transport crates 14, so that the transport crates can be ejected from the rack 13 in the pushing direction S. In FIG. 7, the bottommost transport crate 14 is in the middle of the ejection operation. The transport crate 14 is inclined obliquely upwards in the pushing direction S. Because the transport crate 14 is being pressed upwards at its leading end by the receiving device 21, the trailing end of the transport crate 14 is resting on the guide rails 25. As a result, the distance $A_B$ between the upper edge K of the trailing side wall 17 and the crate bottom 16 of the transport crate 14 located above it, as the cover 18, is maximum. The distance $A_{A1}$ between the upper edge K of the side walls 17 and the cross-member 23 is given by the construction and is less than $A_B$.

Figure 8:
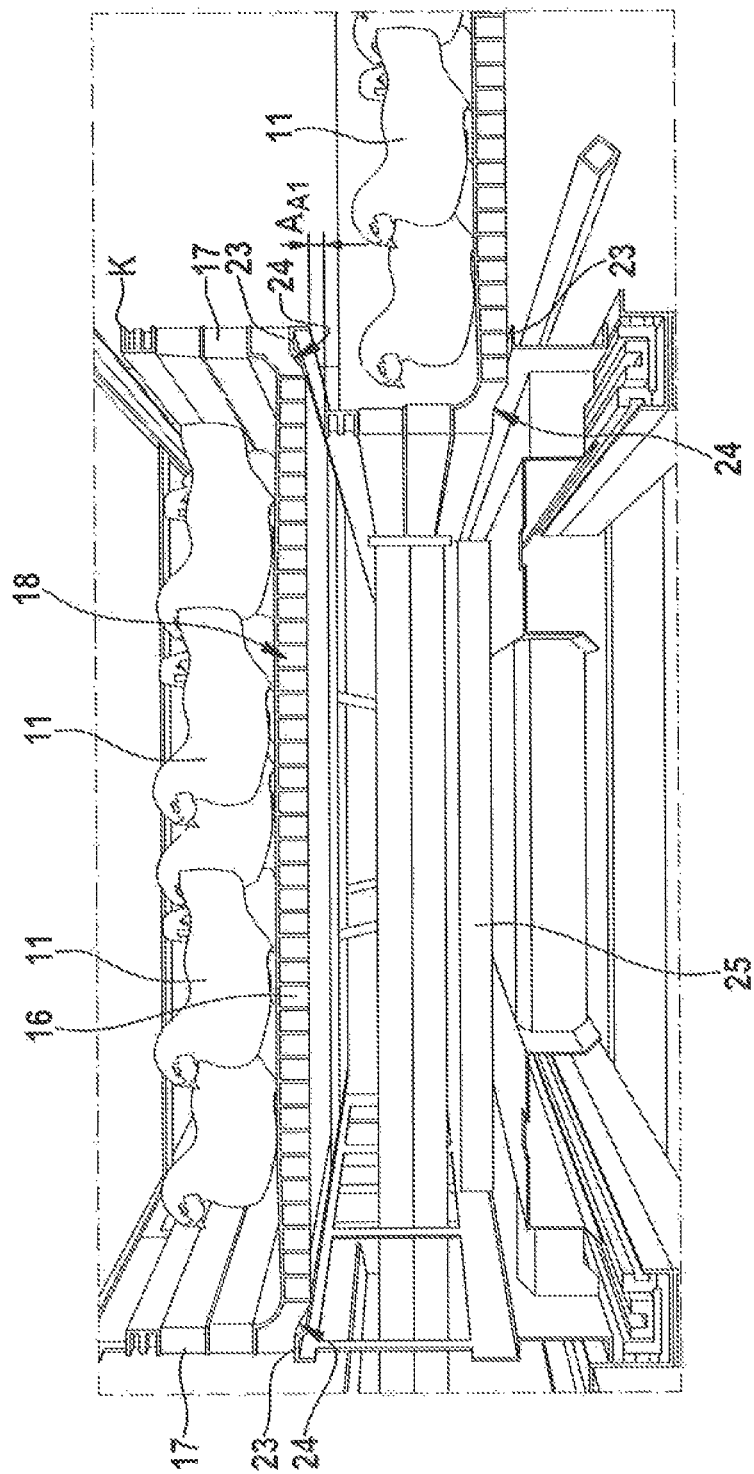
FIG. 8 shows the unloading station according to FIG. 7, wherein the bottommost transport crate is shortly before completion of the ejection operation.
Figure 9:
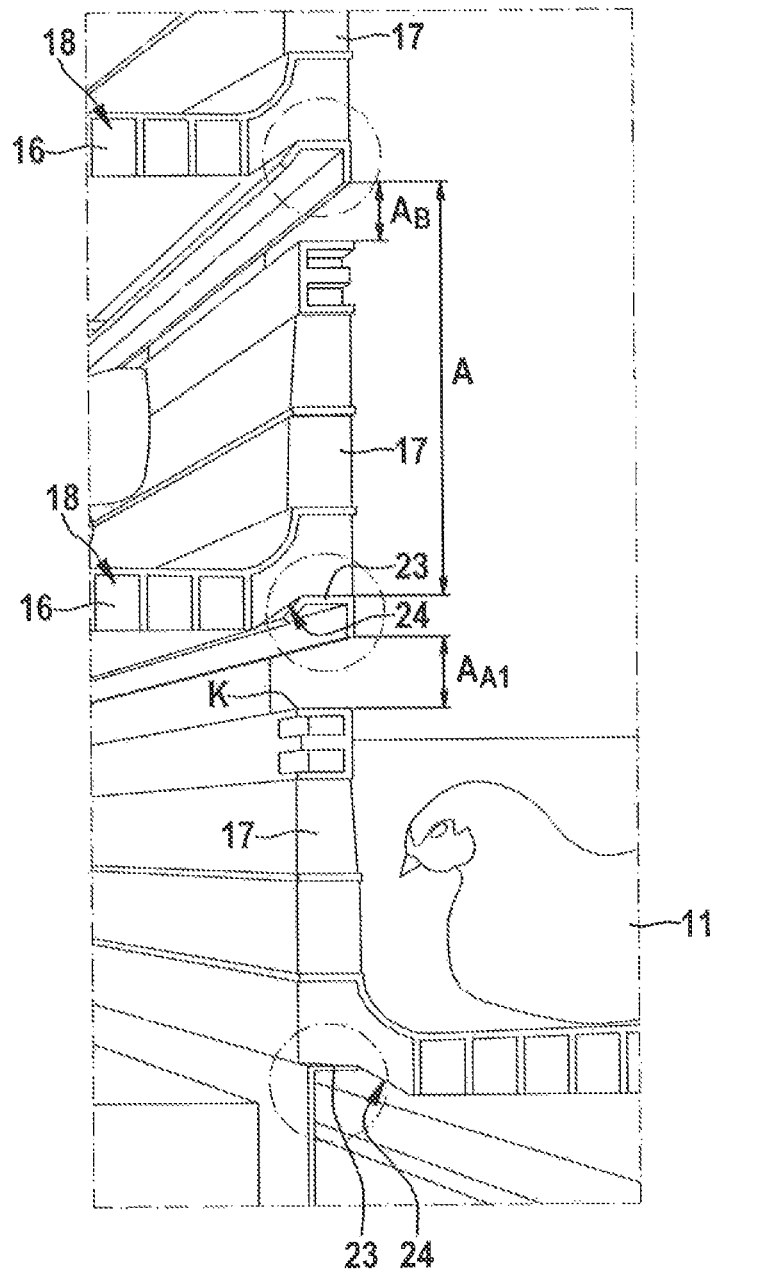
FIG. 9 is an enlarged view of a portion of the exit region of the unloading station, wherein the bottommost transport crate is shortly before completion of the ejection operation.
Figure 10:
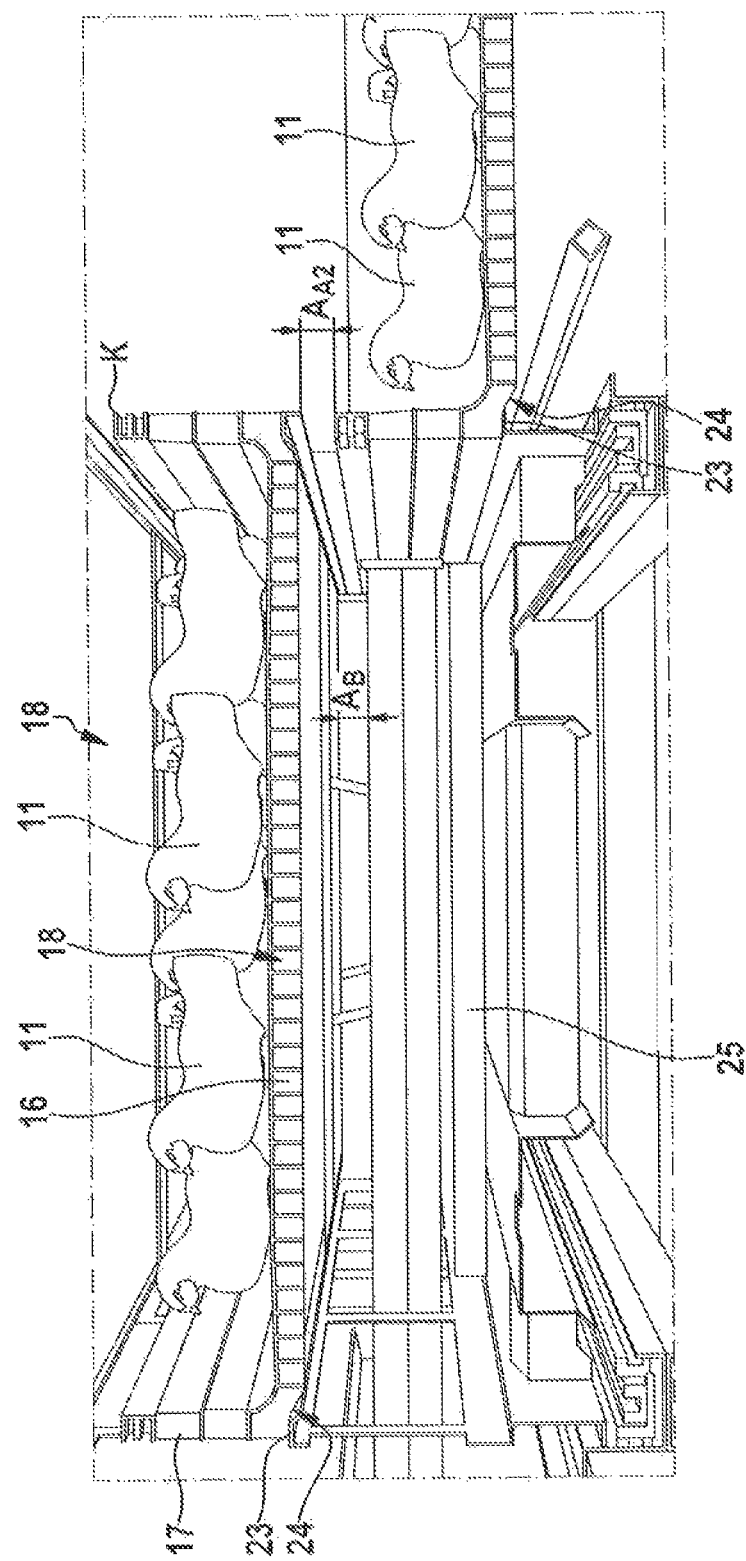
FIG. 10 shows the outlet region according to FIG. 9, wherein the bottommost transport crate has almost completed the ejection operation.

In FIG. 8, the ejection operation is almost complete. The transport crate 14 is located with its trailing end, more precisely with its moulding 24 in the crate bottom 16, on the cross-member 23. This is the brief moment at which the distance between the upper edge K of the trailing side wall 17 and the cover 18, formed by the crate bottom 16 of the transport crate 14 located above it, or the cross-member 23 is minimal and is $A_{A1}$. This moment is shown again on an enlarged scale in FIG. 9. However, the transport crate 14 slides downwards on the cross-beam 23 on its sloping moulding 24, so that the distance $A_{A1}$ is increased to the distance $A_{A2}$ (see FIG. 10). In addition, the receiving device 21 is moved downwards as soon as the transport crate 14 is located fully on the receiving device 21. Because the receiving device 21 is in a higher position and possibly inclined when it collects/receives the transport crates 14 during the ejection operation and is in a lower position and possibly horizontal when the transport crates 14 leave the rack 13 completely, the maximum distance between the upper edge K of the side walls 17 and the cover 18, or the cross-member 23, is maintained at that moment of the ejection operation.

The transport crates 14 located on the receiving device 21 can now be conveyed in the pushing direction S or transversely to the pushing direction S for further processing. When the receiving table 33 of the receiving device 21 is at the same time the conveying table 39, conveying takes place in dependence on the orientation of the transport rollers 34 or of the chain drives 37. In the case where the receiving table 33 is formed separately from the conveying table 39, there is a free choice in terms of the conveying direction, namely in the pushing direction S or transversely to the pushing direction S on both sides. In the preferred embodiment according to the drawing, the chain drives 37 serve as the receiving table 33. The receiving table 33 supports and controls the transport crates 14 during the ejection operation in the manner described above. When the ejection operation is complete, the transport crate 14 can be conveyed further in the pushing direction S by means of the chain drives 37. However, the chain drives 37 can optionally be lowered relative to the conveying table 39 formed by the transport rollers 34 to such an extent that the transport crate 14 rests on the transport rollers 34 only with its crate bottom 16, so that the transport crate 14 can then be conveyed transversely to the pushing direction S, namely to both sides. Instead of lowering the receiving table 33, the conveying table 39 can also be raised. The principle of the method applies analogously when the receiving table 33 is formed by the transport rollers 34 and the conveying table 39 by the chain drives 37.

The method has first been described with reference to the ejection and conveying of a single transport crate 14. However, a plurality of transport crates 14 arranged one above the other in a rack 13 can be ejected from the rack 13 by means of the pushing device 20 simultaneously or in a staggered manner relative to one another, in such a manner that the transport crates 14 of a transport unit 12 are located directly on one another in a stack on the receiving device 21.

The ejection operation and conveying take place in a corresponding manner for a stack formed of transport crates 14.

The invention claimed is:

1. An unloading system, comprising:
   at least one transport unit, which is configured for transporting and/or storing live poultry, has at least one rack and at least one transport crate mounted in the at least one rack for receiving the poultry, wherein
   the at least one rack comprises a transport restraint having a horizontal surface and an angular surface, for each at least one transport crate,
   each at least one transport crate, which has an open top, a crate bottom with at least one ramp-like molding, and peripheral side walls, when arranged in the transport unit, is covered at a top by a cover that is arranged at a distance from an upper edge of the peripheral side walls and at a respective transport restraint, a portion of the at least one transport crate is arranged on the horizontal surface and the angular surface faces the ramp-like molding;
   an unloading station for the at least one transport unit;
   a pushing device for pushing each transport crate situated in an ejection position from the at least one rack in a pushing direction to a receiving device, whereby the at least one ramp-like molding is pushed over the transport restraint and wherein the pushing device and the receiving device are arranged on opposite sides of the unloading station, and
   the receiving device is at least one of height adjustable or pivotable for receiving at least a part of the crate bottom when each transport crate reaches a tipping point over the transport restraint, and is configured to press upwardly the at least the part of the crate bottom received and to convey each transport crate pushed from the at least one rack over a respective transport restraint,
   wherein, a position of each transport crate that is situated in the ejection position in relation to the cover is controllable during an entirety of a pushing operation in the pushing direction in which the at least one ramp-like molding is pushed from an end of the transport crate opposite the at least one ramp-like molding to slide along and over the transport restraint, which vertically raises an upper edge of a leading peripheral side wall of each transport crate in relation to the cover and in which the crate bottom slides along and over the transport restraint to maintain a maximum distance between an upper edge of a trailing peripheral side wall of each transport crate in the pushing direction and the cover in dependence on a position in the rack of each transport crate being pushed, and
   wherein, after the tipping point of each transport unit, the pressing upwardly of the at least the part of the crate bottom received maintains the maximum distance between the upper edge of the trailing peripheral side wall of each transport crate in the pushing direction and the cover in dependence on a position in the rack of each transport crate being pushed until the trailing peripheral side reaches the transport restraint.

2. The unloading system according to claim 1, wherein each transport unit is in quadrangular form,
   wherein each rack is designed and configured for receiving at least two transport crates arranged one on top of the other, so that the crate bottom of one of the at least two transport crates forms the cover for an other of the at least two transport crates located beneath it,
   wherein the transport crate of the at least two transport crates mounted in the topmost position in the rack is covered by a lid element associated with the rack as the cover, and
   wherein each rack:
      has a first rack side facing the pushing device and a second rack side, opposite the first rack side, facing the receiving device,
      comprises, on both the first rack side and the second rack side, cross-members oriented transversely to the pushing direction of the transport crates as transport restraints for each transport crate, where the cross-members cooperate with the at least one ramp-like molding in the crate bottom of each transport crate, where the at least one ramp-like molding is shaped to correspond to a shape of the cross-members, and
      comprises for each transport crate guide rails arranged parallel to the pushing direction of the transport crates for guiding the transport crates within the rack, wherein a vertical distance between the cross-members, which are arranged one above the other, and between a topmost of the cross-members and the lid element of the rack, is in each case greater than a total height of the transport crate, at least on the second rack side facing the receiving device.

3. The unloading system according to claim 1, wherein the receiving device is designed to be adjustable at least in sections in order to change a height position and/or an angular position of the receiving device in relation to the ejection position of each transport crate.

4. The unloading system according to claim 1, wherein the receiving device has a first entry side facing the unloading station and a second exit side facing away from the unloading station, wherein the receiving device has an associated adjustment mechanism by which at least the second exit side, facing away from the unloading station of the receiving device is designed and configured to be movable up and down.

5. The unloading system according to claim 4, wherein the receiving device is designed and configured to be movable up and down on both the first exit side and the second exit side by the adjustment mechanism.

6. The unloading system according to claim 4, wherein the adjustment mechanism comprises a control device which is designed and configured to control the adjustment mechanism in dependence on a position of each transport crate within the rack during the ejection operation.

7. The unloading system according to claim 4, wherein the receiving device comprises a receiving table for receiving the transport crates during the ejection operation, the receiving table being designed and configured to be adjustable in respect of a height position and/or an angular position by the adjustment mechanism.

8. The unloading system according to claim 7, wherein the receiving table is formed of a plurality of transport rollers which are arranged parallel to and at a distance from one another and which are rotatably driven by a rotation driver.

9. The unloading system according to claim 8, wherein the receiving table has an associated conveying table for conveying away the fully ejected transport crates, wherein the conveying table and the receiving table are movable relative to one another at least in the vertical direction by at least one driver and have different conveying directions.

10. The unloading system according to claim 9, wherein the conveying table is formed of a plurality of transport rollers which are arranged parallel to and at a distance from one another and are fixed in position and which are rotatably driven by the rotation driver.

11. The unloading system according to claim 7, the receiving table is formed of at least two chain drives which are arranged at a distance from one another and which are drivable by a chain drive driver.

12. The unloading system according to claim 1, wherein the unloading station has an associated lifting unit for moving the rack vertically into the respective ejection position for the transport crates.

13. The unloading system according to claim 1, wherein the pushing device comprises at least one pusher for ejecting a single transport crate or a plurality of transport crates.

14. The unloading system according to claim 1, wherein during at least a portion of the ejection operation, the crate bottom is oriented at a non-zero angle to the pushing direction.

15. A method of unloading at least one transport unit which is configured for transporting and/or storing live poultry and has at least one rack and at least one transport crate mounted in the at least one rack for receiving the poultry, wherein each at least one transport crate has an open top, a crate bottom with at least one ramp-like molding, and peripheral side walls and when mounted in the rack, each transport unit is covered at a top by a cover arranged at a distance from upper edges of the side walls, wherein the at least one rack includes a transport restraint for each at least one transport crate that has a horizontal surface and an angular surface, and at a respective transport restraint, a portion of the at least one transport crate is arranged on the horizontal surface and the angular surface faces the ramp-like molding, the method comprising:

introducing at least one transport unit into an unloading station, ejecting pushing, via a pushing device, an end of at least one transport crate situated in an ejection position from the rack in a pushing direction toward a receiving device, whereby the at least one ramp-like molding, which is arranged on an end of the at least one transport crate opposite the end being pushed by the pushing device, is pushed along and over the transport restraint and the crate bottom is pushed along and over the transport restraint, and receiving on the receiving device at least a part of the crate bottom when each transport crate reaches a tipping point over the transport restraint, and pressing upwardly the at least the part of the crate bottom received and conveying each transport crate ejected from the rack by the receiving device, which is arranged on a side of the unloading station opposite the pushing device, wherein a position of each transport crate situated in the ejection position in relation to the cover is controllable during an entirety of a pushing operation in the pushing direction so that, as the at least one ramp-like molding is pushed along and over the transport restraint, an upper edge of a leading peripheral side wall of each transport crate being pushed is vertically raised in relation to the cover, and, as the crate bottom slides along and over the transport restraint, a maximum distance is maintained between an upper edge of a trailing peripheral side wall of each transport crate being pushed and the cover in dependence on a position within the rack of each transport crate being pushed, and wherein, after the tipping point of each transport unit, the pressing upwardly of the at least the part of the crate bottom received maintains the maximum distance between the upper edge of the trailing peripheral side wall of each transport crate in the pushing direction and the cover in dependence on a position in the rack of each transport crate being pushed until the trailing peripheral side reaches the transport restraint.

16. The method according to claim 15, wherein a leading end of each transport crate in the pushing direction is first raised during the ejection operation by pushing of the at least one ramp-like molding in the pushing direction against a cross-member formed as the transport restraint of the rack, wherein the crate bottom of the transport crate being ejected is received by the receiving device at a latest when at least half of the transport crate has been ejected from the rack and is pressed so far upwards, by the receiving device being guided upwards, that the upper edge of a trailing side wall of the transport crate in the pushing direction is maintained at the maximum distance from the cover until it reaches the cross-member, along which it slides.

17. The method according to claim 16 wherein the transport crate is moved downwards, by the receiving device being guided downwards, as soon as it has been fully ejected from the rack and the crate bottom of the transport crate has passed over and left the cross-member, along which it slid, in order to increase a distance between the upper edge of the trailing side wall of the transport crate and the cross-member of the rack located above it.

18. The method according to claim 15, wherein the transport crates, when located fully on the receiving device, are conveyed further either in the pushing direction or transversely to the pushing direction.

19. The method according to claim 15, wherein the receiving device is controlled automatically by a control device in dependence on a position of each transport crate within the rack during the ejection operation.

20. The method according to claim 19, wherein the receiving device is moved up and/or down by the control device either on a side facing the unloading station and/or on a side facing away from the unloading station, so that each transport crate is guided along an individual movement path in the ejection operation while maintaining the maximum distance between the upper edge of the trailing side wall of the transport crate and the cover.

21. The method according to claim 15, wherein a plurality of transport crates arranged one above the other in the rack are ejected from the rack by the pushing device simultaneously or in a staggered manner relative to one another, in such a manner that the transport crates of a transport unit are located on the receiving device directly on top of one another in a stack.

22. The method according to claim 15, wherein during at least a portion of the ejection operation, the crate bottom is oriented at a non-zero angle to the pushing direction.

* * * * *

UNITED STATES PATENT AND TRADEMARK OFFICE
CERTIFICATE OF CORRECTION

PATENT NO. : 12,262,698 B2  
APPLICATION NO. : 16/316750  
DATED : April 1, 2025  
INVENTOR(S) : Henrik Ovesen Page 1 of 1

It is certified that error appears in the above-identified patent and that said Letters Patent is hereby corrected as shown below:

In the Claims

Claim 15, Line 18, please delete the word "ejecting"

Signed and Sealed this  
First Day of July, 2025

Coke Morgan Stewart  
*Acting Director of the United States Patent and Trademark Office*